Figure 1:
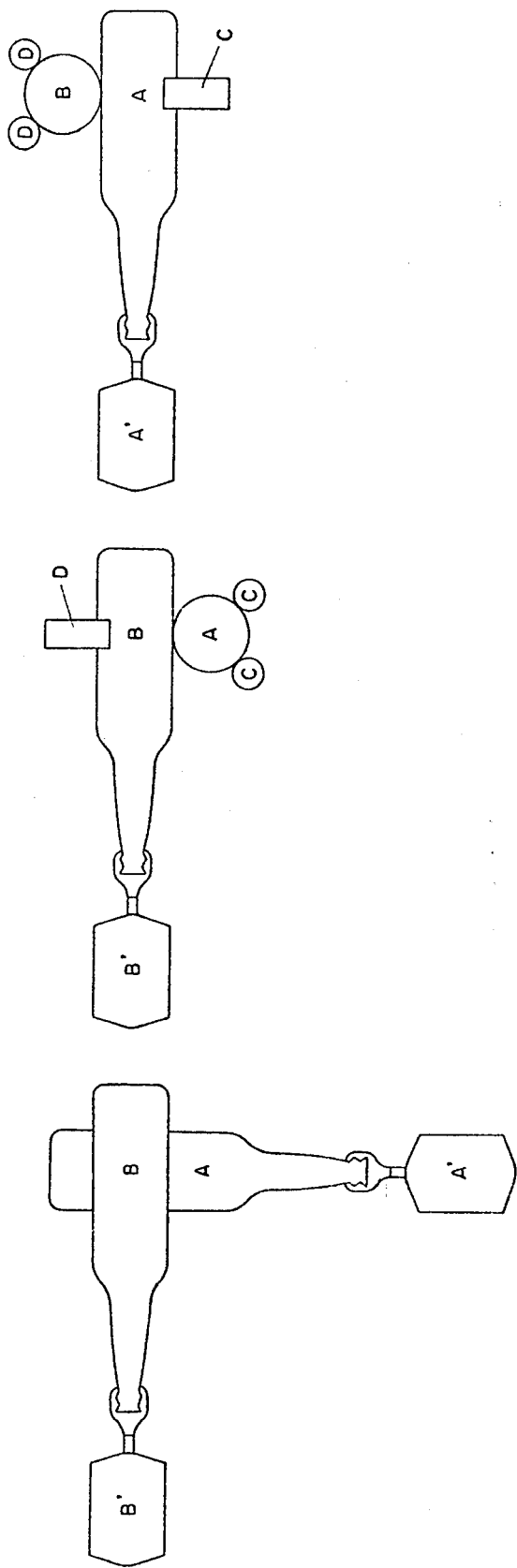

United States Patent
Tatsumi et al.

[11] 3,877,969
[45] Apr. 15, 1975

[54] COATED GLASS BOTTLES

[75] Inventors: Tetsujiro Tatsumi; Reiji Miyamoto, both of Chiba; Yutaka Matsui, Shizuoka; Seiji Kazama, Kawanishi; Tadao Takemura, Nara; Hikoyoshi Kanayama, Chiba, all of Japan

[73] Assignees: Takeda Chemical Industries, Ltd., Osaka; Mitsui Polychemicals, Co., Ltd., Tokyo, Japan

[22] Filed: May 21, 1973

[21] Appl. No.: 362,502

[30] Foreign Application Priority Data
July 19, 1972 Japan................................ 47-72953

[52] U.S. Cl. ........... 428/216; 215/DIG. 6; 428/336; 428/425; 428/442
[51] Int. Cl...................... B32b 17/10; C03c 17/32
[58] Field of Search...... 117/124 E, 72, 94, 161 KP; 215/DIG. 6

[56] References Cited
UNITED STATES PATENTS

| | | |
|---|---|---|
| 3,030,249 | 4/1962 | Schollenberger et al. 117/161 KP X |
| 3,310,533 | 3/1967 | McElroy .................... 117/161 KP X |
| 3,407,085 | 10/1968 | Kitaj et al. ................ 117/161 KP X |
| 3,415,673 | 12/1968 | Clock........................................ 117/72 |
| 3,520,861 | 7/1970 | Thomson et al. ........... 117/124 E X |
| 3,674,896 | 7/1972 | Purcell et al. .............. 117/124 E X |
| 3,711,456 | 1/1973 | Gilbert et al. .............. 117/124 E X |
| 3,765,928 | 10/1973 | Smarook.............................. 117/72 |

Primary Examiner—Ralph Husack
Attorney, Agent, or Firm—Wenderoth, Lind & Ponack

[57] ABSTRACT

Glass bottles, suitable as containers for drinks, such as, beer and fruit juices, are coated first with an olefine copolymer containing hydroxyl or both hydroxyl and carboxyl groups in its molecule, and then with a thermoplastic polyurethane. The so coated bottles break less easily than conventional glass bottles, show less tendency to scatter when they are broken, and are not easily scratched.

7 Claims, 2 Drawing Figures

COATED GLASS BOTTLES

The present invention is concerned with coated glass bottles having excellent and improved properties.

Glass bottles have long been used in various fields, for example, as containers for beer, wine, whiskey, champagne, cola drinks, fruits juice, other soft drinks, etc., by virtue of their properties of high transparency, high resistance to chemicals, and no gas-permeability, etc. However, one fatal defect of glass bottles is low impact strength, and thus glass bottles are easily broken, and once broken, pieces of glass are scattered. Particularly, when glass bottles containing aerated drinks such as beer, coke, etc. are broken, the scattering of glass pieces is rather explosive.

For the purpose of eliminating or reducing this defect, it has been proposed that the surface of glass bottles is coated with some kinds of synthetic resins such as polyethylene, ethylene-vinyl acetate copolymer, polyvinyl acetate, etc. However, in the glass bottles coated with such resins as mentioned just above, such characteristics are apt to be lost that are proper to "glass" itself, such as transparency, resistance to chemicals, particularly alkaline substances, etc. More particularly, when the glass bottles coated with such resins as above are subjected to a process for washing with an aqueous solution of a strong alkaline substance, this process being necessary in most cases before filling the bottles with a drink, the coated materials are degraded by the alkaline substance and finally peeled off or the transparency is almost completely lost. Further, many cracks and cuts are brought about on the surface of the coated bottles on their packing, filling-up, washing and other handling steps, and thus their appearance becomes very poor, and if the cracks or cuts are such as penetrating to the glass layer, they accelerate not only the peeling-off of the coated layer but also the breakage of the bottles.

Because of the defect as mentioned above, the coated bottles, which have hitherto been proposed, cannot be put into practical use even in one cycle, and needless to say, in repeating cycles.

For the purpose of eliminating the defect of glass bottles, i.e., easy breakage by impact and scattering of glass pieces upon breakage, without sacrificing the characteristics proper to glass, i.e., transparency, resistance to chemicals, particularly alkaline substances, etc., the present inventors have made extensive studies. As the result of the studies, the present inventors found out that, when the breakage of glass bottles and scattering of glass pieces upon breakage are intended to be inhibited by coating the surface of the glass bottles with some kind of coating material, all of coating materials having high strength and high adhesive to glass are not always satisfactory to this purpose, but that some other factors are decisive therefor, though they are unknown and unclear.

Thus, taking this finding into consideration, the present inventors have made further studies for finding a coating material desirably suitable for this purpose, and reached another finding that the afore-mentioned purpose can be attained by coating the surface of glass bottles with two different kinds of coating materials in a specific sequence, the coating material to be applied at first being an olefine copolymer containing OH and/or COOH groups in its molecule and that to be applied subsequently being a thermoplastic polyurethane of a specific molecular weight range.

Regarding the second coated layer, so-called alkyd resins, melamine resins, modified melamine resins, modified alkyd resins, and many other resins have been known as showing high hardness, high strength and high adhesion to glass, comparable with so-called polyurethane resins. However, in cases where the above resins are used as the second layer in the present invention, the object of the present invention cannot be attained, namely, scattering of glass pieces upon breakage cannot effectively be inhibited, and exceptionally only in cases where the above-mentioned thermoplastic polyurethane is used as the second layer, the object of the present invention can effectively be attained.

The present invention was accomplished on the basis of these findings.

Thus, the present invention relates to glass bottles the surface of which is coated at first with an olefine copolymer containing OH and/or COOH groups in its molecule and then with a thermoplastic polyurethane.

In the glass bottles of the present invention, breakage by impact can effectively be inhibited and even if broken, scattering of the broken glass pieces can be inhibited substantially completely, while the characteristics proper to glass are not sacrificed. That is to say, even after the glass bottles of the invention are subjected to processes for washing with alkaline substances, filling-up, packing, etc., there is found no cracks or cuts in the surface of the bottles and the transparency of the bottles is not reduced.

Therefore, the coated glass bottles of the present invention can be used repeatedly for containers of various kinds of drinks, especially aerated drinks, without hazard of injuring the human-body by would-be broken and scattered glass pieces and without hindering the appearance of the bottles.

Hereinafter is given a detailed explanation of the present invention.

According to the present invention, the surface of glass bottles is at first coated with an olefine copolymer containing OH and/or COOH groups in its molecule. The glass bottles employed in this invention may be any of conventional ones.

The olefine copolymers containing OH and/or COOH groups in its molecule include copolymers containing repeating units of (a)

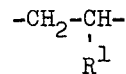

(wherein $R^1$ is hydrogen or a lower alkyl of 1 to 2 carbon atoms), (b) 

(wherein $R^2$ is hydrogen or methyl, $X^1$ is $-OH$, $-COOH$ or $-COO(CH_2)_n-OH$ in which $n$ is 1 to 3) and (c) 

wherein $R^2$ has the same meaning as above and $X^2$ is $-OCOR^3$ or $-COOR^4$ in which $R^3$ and $R^4$ are a lower alkyl of 1 to 4 carbon atoms). These copolymers are desirably those having a melt index of about 0.5 to about 1,000 (g/10 min), more preferably about 50 to about 500(g/10 min). The total amount of the above repeating units of (b) and (c) in the copolymers is about 1 to about 50 mole percent, more preferably about 5 to about 20 mole percent, and the amount of the repeating unit (b) is about 50 to about 100 mole percent, more preferably about 55 to about 95 mole percent, relative to the total amount of the repeating units (b) and (c).

When these copolymers contain —COOH groups, they may be in a state of metal salt or so-called ionic copolymer ionized by neutralization with a metal. The metal includes mono-, di- and trivalent ones in Groups I, II, III, IV-A and VIII of the Periodic Table of Elements, such as Na, K, Li, Cs, Ag, Cu, Mg, Ca, Ba, Cd, Sn, Pb, Fe, Co, Ni and Zn.

These copolymers may be prepared, for example, by the following methods (1) (i) a lower α-olefine of the formula $CH_2=CHR^1$ (wherein $R^1$ has the same meaning as above) such as ethylene, propylene, butylene, etc., is copolymerized with (ii) acrylic acid, methacrylic acid, or hydroxy-lower alkyl (e.g., hydroxymethyl, hydroxyethyl, hydroxypropyl, etc.) acrylate or methacrylate. A molar ratio of (i)/(ii) is about 99/1 to about 50/50, more preferably about 95/5 to about 80/20. Five to 50 mole percent of the monomer (ii) may be replaced by a monomer of the general formula $$CH_2=CR^2$$
$$|$$
$$X^2$$

(wherein $R^2$ and $X^2$ have $X^2$ the same meaning as above), which is exemplified by vinyl acetate, vinyl propionate, vinyl butyrate, acrylic or methacrylic acid lower alkyl esters (methyl, ethyl, propyl, butyl esters, etc.) and so on.

(2) a lower α-olefine as mentioned above in (1) is copolymerized with a compound of the general formula $$CH_2=CR^2$$
$$|$$
$$X^2$$

(wherein $R^2$ and $X^2$ have the same meaning as $X^2$ above), whose typical examples are as mentioned above in (1), and the resulting copolymer is hydrolyzed, partially or completely. A molar ratio of the two monomers to be used falls within the same range as defined above in (1). The degree of hydrolysis is about 50 to about 100 mole percent, more preferably about 55 to about 95 mole percent, relative to the groups shown by the symbol $X^2$.

For better understanding, the preparation of some of these copolymers is illustrated below;

$$\begin{pmatrix} CH_2=CHR^1 \\ + \\ CH_2=CR^2 \\ | \\ COOH \end{pmatrix} \xrightarrow{\text{copolymerization}} -((CH_2-CH-)_p(-CH_2-\underset{|}{\overset{R^2}{C}}-)_q)_m-$$
$$\overset{R^1}{\underset{COOH}{}}$$

(corresponding to $X^1=-COOH$)

$$\begin{pmatrix} CH_2=CHR^1 \\ + \\ CH_2=CR^2 \\ | \\ COO(CH_2)_nOH \end{pmatrix} \xrightarrow{\text{copolymerization}} -((CH_2-CH-)_p(-CH_2-\underset{|}{\overset{R^2}{C}}-)_q)_m-$$
$$COO(CH_2)_nOH$$

(corresponding to $X^1=-COO(CH_2)_nOH$)

$$\begin{pmatrix} CH_2=CHR^1 \\ + \\ CH_2=CR^2 \\ | \\ COOR^4 \\ + \\ CH_2=CR^2 \\ | \\ COOH \end{pmatrix} \xrightarrow{\text{copolymerization}} -((CH_2-CH-)_p(-CH_2-\underset{|}{\overset{R^2}{C}}-)_{q'}(-CH_2-\underset{|}{\overset{R^2}{C}}-)_r)_m$$
$$\quad\quad\quad\quad COOR^4 \quad\quad COOH$$

(corresponding to $X^1=-COOH$, co-use of $CH_2=CR^2$ in which $X^2=COOR^4$)

$$\begin{pmatrix} CH_2=CHR^1 \\ + \\ CH_2=CR^2 \\ | \\ COO(CH_2)_nOH \\ + \\ CH_2=CR^2 \\ | \\ COOR^4 \end{pmatrix} \xrightarrow{\text{copolymerization}} -((CH_2-CH-)_p(-CH_2-\underset{|}{\overset{R^2}{C}}-)_{q'}(-CH_2-\underset{|}{\overset{R^2}{C}}-)_r)_m$$
$$\quad\quad\quad\quad COOR^4 \quad\quad COO(CH_2)_nOH$$

(corresponding to $X^1=-COO(CH_2)_nOH$, co-use of $CH_2=CR^2$ in which $X^2=COOR^4$)

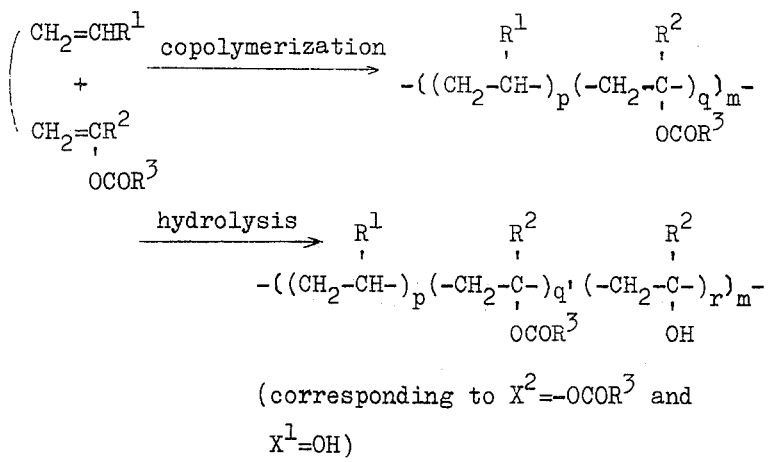

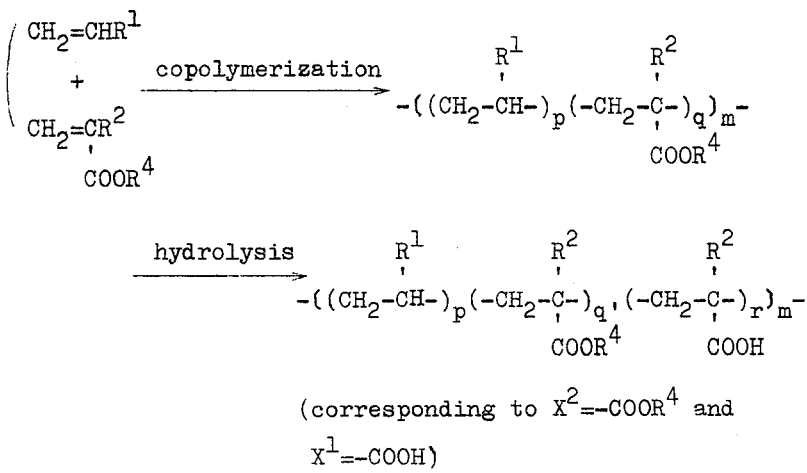

In the above, $p/q$ is about 99/1 to about 50/50 (mol/mol), more preferably about 95/5 to about 60/40 (mol/mol), $q' + r = q$, and $100 \times r/(q'+r)$=about 50 to about 100, more preferably about 55 to about 95, and $m$ is polymerization degree, which is adjusted so as to make the melt index of the copolymer about 0.5 to about 1,000 (g/10 min), more preferably about 20 to about 500 (g/10 min), and generally falls within a range of about 5 to about 600, more preferably about 30 to about 400.

The detailed and concrete techniques and conditions for preparation of these copolymers may be any of conventional ones, for example, those described in U.S. Pat. Nos. 2,200,429, 2,703,794, 2,386,347, etc.

The metal salt and ionic copolymers can be prepared from the above-mentioned copolymers in a conventional manner. In regard to preparation of the ionic copolymers, U.S. Pat. No. 3,264,272, for example, is cited as a literature reference.

Among these olefine copolymers, desirable are hydrolyzed olefine/vinyl acetate copolymers, olefine/methacrylic acid copolymers, partially hydrolyzed olefine/acrylic acid ester copolymers, partially hydrolyzed olefine/methacrylic acid ester copolymers, etc., particularly hydrolyzed olefine (e.g., ethylene, propylene, butylene, etc., especially ethylene)/vinyl acetate copolymers whose hydrolysis degree is about 5 to about 100 mole percent, more preferably about 55 to about 95 mole percent.

Coating the surface of the glass bottles with the olefine copolymer is conducted in a conventional manner. For example, into a powdery olefine copolymer fluidized by air or other inert gas is dipped a glass bottle which is previously heated at higher than the softening point of the copolymer; the powdery copolymer is adhered to the surface of a glass bottle by means of electrostatic coating technique and then melted by hearing at higher than the softening point of the copolymer; into a solution of the copolymer in a suitable solvent (e.g., toluene, butyl acetate, Cellosolve acetate, etc.) is dipped a glass bottle or the solution is applied on the surface of a glass bottle, followed by drying. Thickness of the thus coated copolymer layer is more than about 50 microns, more preferably about 100 to about 500 microns.

Then, the thus coated glass bottle is further coated with a thermoplastic polyurethane.

The thermoplastic polyurethane of the present invention is that which has a molecular weight of about 10,000 to about 500,000, more preferably about 10,000 to about 50,000 and is prepared by reacting an organic diisocyanate with a diol having an average molecular weight of about 60 to about 1,000, more preferably about 100 to about 400, at a ratio of NCO/OH being around 1/1 (mol/mol).

The organic diisocyanate usable in this invention includes, for example, phenylene diisocyanate, tolylene diisocyanate (TDI), naphthylene diisocyanate, diphenylmethane diisocyanate (MDI), $\omega, \omega'$-diisocyanate dimethylbenzene (XDI), tetramethylene diisocyanate, hexamethylene diisocyanate (HMDI), cyclohexylene diisocyanate, methyl cyclohexylene diisocyanate, $\omega, \omega'$-diisocyanate dimethylcyclohexane ($H_6$XDI), dicyclohexylmethane diisocyanate ($H_{12}$MDI), isophorone diisocyanate, etc., and polyurethane diisocyanates which are prepared by reacting an excess amount of the above-mentioned diisocyanate with a low molecular diol having a molecular weight of about 60 to about 2,000, such as ethylene glycol, propylene glycol, butylene glycol, hexylene glycol, etc.

The diol usable for the reaction with the above-mentioned diisocyanate or polyurethane diisocyanate includes, for example, the above-mentioned diol, (e.g., ethylene glycol, diethylene glycol, propylene glycol, butylene glycol, hexylene glycol, etc.), a polyester diol having a molecular weight of about 200 to about 2,000 which is prepared by polycondensation of an aliphatic or aromatic dibasic carboxylic acid (e.g., maleic acid, fumaric acid, adipic acid, azelaic acid, sebacic acid, phthalic acid, isophthalic acid, terephthalic acid, etc.) with a glycol (e.g., ethylene glycol, propylene glycol, etc.), a polycaprolactone diol having a molecular weight of about 300 to about 2,000 which is prepared by ring-opening polycondensation of $\epsilon$-caprolactone, a polyether diol having a molecular weight of about 300 to about 2,000 which is prepared by reacting the above-mentioned low molecular diol with an alkylene oxide such as ethylene oxide, propylene oxide, butylene oxide, tetrahydrofuran, etc., a polyesterether diol having a molecular weight of about 500 to about 2,000 which is prepared by ring-opening polymerization of a mixture of an acid anhydride (e.g., maleic anhydride, phthalic anhydride, etc.) and an alkylene oxide (e.g., ethylene oxide, propylene oxide, etc.), and so on.

When a diol having a molecular weight higher than about 1,000 is employed, it is used in a state of admixture with a diol having much lower molecular weight in such a ratio that the whole diol mixture has an average molecular weight falling within a range of 60 to 1,000, more desirably 100 to 400.

The reaction of the organic diisocyanate with the diol for the production of the thermoplastic polyurethane is conducted in a conventional manner, for example, by reacting the starting materials at a ratio of NCO/OH being around 1/1 (mol/mol), more particularly 1/0.98 to 1/1.05 (mol/mol) in the absence or presence of an inert solvent such as ethyl acetate, methyl ethyl ketone, cyclohexane, and tetrahydrofuran at room temperature to about 150°C for about 10 to 30 hours.

The thermoplastic polyurethane is dissolved in an organic solvent to give a solution of the non-volatile matter content of about 5 to about 50 weight percent, more preferably about 10 to about 35 weight percent. Thus prepared solution is used for application on glass bottles. When the solution is used, it may further be diluted with an aromatic hydrocarbon, or an alcohol such as ethanol and ethylene glycol monomethyl ether.

The solvent for dissolving the thermoplastic polyurethane includes, for example, esters (e.g., ethyl acetate, isopropyl acetate, butyl acetate, cellosolve acetate, etc.), cyclic ethers (e.g., tetrahydrofuran, dioxane, etc.), ketones (e.g., acetone, methyl ethyl ketone, methyl isobutyl ketone, cyclohexanone, etc.), halogenated hydrocarbons (e.g., methylene chloride, ethylene chloride, etc.), alcohols (e.g., cellosolve, methyl cellosolve, etc), and the like.

The aromatic hydrocarbon as the diluent includes, for example, toluene, xylene, etc.

Coating with the thermoplastic polyurethane can be conducted in a conventional manner. For example, into the solution of the thermoplastic polyurethane is dipped a glass bottle, or the solution is applied on the surface of a glass bottle, followed by drying. Thickness of the thermoplastic polyurethane layer is about 5 to about 200 microns, more preferably about 10 to about 100 microns. The coating is generally conducted at a room temperature. The drying is conducted at a room temperature or under heating at about 40° to about 80°C.

The present invention is applicable to various kinds of glass bottles such as those for aerated drinks (e.g., beer, champagne, cola drinks, carbonated water, etc.), low-boiling liquid chemicals (e.g., ether, benzin, etc.), and the like.

In the following Examples and Control and tests, the word "part" means "weight part" unless otherwise noted, and relation between "weight part" and "volume part" is the same as between "gram" and "milliliter".

Control

A copolymer of ethylene and vinyl acetate (vinyl acetate content: 28 weight percent, molecular weight: about 10,000) is hydrolyzed by methanolic solution of sodium hydroxide to give a fine powdery (100 mesh pass) partially hydrolyzed copolymer (90 percent of the acetoxy groups in the original copolymer is hydrolyzed. Melt index: 190, Melting point: 90°C).

About 20 parts of the partially hydrolyzed copolymer is adhered to the surface of a glass bottle for beer (633 ml capacity, weight: 580 g, wall thickness, 3–4 mm) by means of electrostatic adhesion technique, which is previously heated at 200°C, and then the bottle is further heated at 200°C for 10 minutes, whereby the surface of the glass bottle is coated with a copolymer layer of 100 microns in thickness.

The thus coated layer, however, has only poor strength, and when two coated glass bottles are lightly rubbed with each other, many scratches are caused on the coated layer.

EXAMPLE 1

To a solution of 50 parts of polybutylene adipate of hydroxyl number of 225 and 6.7 parts of dipropylene glycol in 100 parts of tetrahydrofuran is added 38 parts of diphenylmethane-4,4'-diisocyanate, followed by heating at 60°C with stirring for 22 hours. The resultant mixture is diluted with 437 parts of methyl ethyl ketone. Thus a thermoplastic polyurethane solution containing 15 percent non-volatile portion is obtained.

The glass bottle treated in the control is further immersed into the above-obtained thermoplastic polyurethane solution, followed by drying at room temperature. Thickness of the thermoplastic polyurethane coating layer thus formed is 20 microns.

Thus treated glass bottle shows substantially the same transparency as a non-coated glass bottle, and no scratch is brought about even when two glass bottles are strongly rubbed with each other.

EXAMPLE 2

The same glass bottle as in the control is coated with fine powders of ethylene-methacrylic acid copolymer (molecular weight: about 7,000, methacrylic acid component content: 15 weight percent) in a similar manner to the control (thickness of the coated layer: 140 microns). The glass bottle is then coated with a thermoplastic polyurethane solution in a similar manner to the Example 1 (thickness of the coated layer: 30 microns), the thermoplastic polyurethane solution being prepared by the following manner. 176 Parts of tolylene diisocyanate (2,4–/2,6–=80/20 by weight) is reacted with 285 parts of a polyester diol of hydroxyl number of 56 which is obtained by reacting 4.7 mole parts of dipropylene glycol, 5 mole parts of 1,4-butane diol and 8.5 mole parts of adipic acid with one another, by heating at 85°C for 2 hours, followed by addition of 576 parts of ethyl acetate. To the resultant mixture are added 115 parts of dipropylene glycol and 0.5 part of stannous octoate, followed by heating at 70°C for 8 hours. The resultant mixture is then diluted with 1,152 parts of ethyl acetate. Thus there is obtained a thermoplastic polyurethane solution containing 25 percent non-volatile portion.

Thus coated glass bottle shows excellent properties as in the coated glass bottle of the Example 1.

EXAMPLE 3

The same glass bottle for beer is coated with fine powdery partially hydrolyzed ethylene/vinyl acetate copolymer which is prepared by hydrolyzing 85 percent of acetoxy groups of a copolymer of 40 weight percent of ethylene and 60 weight of vinyl acetate and shows melt index of 35 and melting point of 93 C. Thickness of the coated layer is 100 microns.

The bottle is then coated with a thermoplastic polyurethane resin solution (thickness of coated layer : 30 microns), the resin solution being that prepared as follows. A mixture of 118 parts of dipropylene glycol and 232 parts of polyethylene butylene adipate of hydroxy number of 55.5, which is prepared from 1 mole part of ethylene glycol, 1 mole part of 1,4-butane diol and 1.8 mole part of adipic acid, is heated at 70°C, and to the resultant mixture is added 265 parts of dicyclohexylmethane-4,4'-diisocyanate heated at 60°C, followed by heating gradually up to 100°C over 20 minutes. After heating at this temperature for further 30 minutes with agitation, and the resultant mixture is heated at 100°C for 10 hours in nitrogen gas streams and then, after cooling, dissolved in tetrahydrofuran to give a thermoplastic polyurethane resin solution containing 10 percent non-volatile portion.

Thus treated glass bottle is excellent in its gloss, transparency and smoothness of the surface.

EXAMPLE 4

A homogeneous mixture of 662 parts of ethyl acetate, 662 parts of methylethyl ketone, 134 parts of dipropylene glycol and 96 parts of polybutylene adipate of hydroxy number of 215 is further mixed with 211 parts of tolylene diisocyanate (2,4–/2,6 =80/10), followed by heating at 70°C for 2 hours. The resultant mixture is mixed with 0.4 part of stannous octoate and heated at 70°C for 6 hours. This procedure gives a thermoplastic polyurethane resin solution containing 25 percent non-volatile portion.

The glass bottle obtained in the control is further treated with the above-prepared resin solution in a similar manner to the foregoing Examples. Thickness of the second coated layer is 25 microns.

Thus treated bottle is excellent in its gloss, transparency and smoothness of the surface.

EXAMPLE 5

To a solution of 198.8 parts of polybutylene adipate of hydroxy number of 111 in 471 of tetrahydrofuran are added 80.7 parts of ω, ω'-diisocyanate-1,4-dimethylcyclohexane and 0.2 part of stannous octoate, followed by heating at 60°C for 3 hours.

To the resultant mixture is added gradually over 1 hour a solution consisting of 34 parts of isophoronediamine, 1.32 part of dibutylamine and 471 parts of methyl cellosolve. 60 Parts of the resulting solution is diluted with 40 parts of methyl Cellosolve, whereby there is obtained a thermoplastic polyurethane resin solution containing 15 percent non-volatile portion.

The glass bottle obtained in the control is coated with the above-prepared resin solution in a similar manner to the Example 1. Thickness of the second coated layer is 20 microns. Thus treated glass bottle is excellent in its gloss, transparency, smoothness of the surface and mechanical strength of the coated layers.

For the purpose of evaluation of the coated glass bottles obtained in the foregoing Control and Examples, the following two tests are conducted.

1. Abrasion resistance test

The test is conducted as illustrated in the FIG. 1. One glass bottle laid sideways (A) is placed on the other glass bottle also laid sideways (B) at an angle of 90°. The two bottles (A) and (B) are connected with motors (A') and (B'), respectively. The lower bottle (B) is sustained by rotary rubber rollers (C), while the upper bottle (A) is contacted with the lower bottle by its dead weight. Two other rotary rubber rollers (D) are placed on the upper portions of the upper bottle (B) so as to inhibit shift of the bottle (B). The load for the test can be increased freely by charging the bottle (B) with a suitable amount of water or other liquid. The two bottles (A) and (B) are rotated by the motors (A') and (B') at a pre-determined speed, whereby the two bottles are abraded with each other.

The coated glass bottles prepared in the Control and Examples are tested in the foregoing manner at 60 rounds per minute under the loads of 600, 1,200 and 1,800 g., and after 10, 100 and 1,000 rounds, the scratches flawed are observed to the naked eye.

The result is summarized in the Table 1.

Table 1

| Bottle | | Load of bottle (B) | Number of rounds | Abrasion* |
|---|---|---|---|---|
| Control | | 600 (g) | 10 | +++ |
| Example | 1 | 1800 | 1000 | + |
|  |  | 1200 | 1000 | − |
|  | 2 | 1800 | 1000 | − |
|  | 3 | 1800 | 1000 | − |
|  | 4 | 1800 | 1000 | − |
|  | 5 | 1800 | 1000 | + |
|  |  | 1200 | 1000 | − |

\* − : no scratch is observed.
+ : only a slight scratch is observed.
+++ : remarkable scratches are observed.

As is clear from the above, in the bottle of the Control, there are observed remarkable abrasions only after 10 rounds under a load of 600 g, while in the bottles of Examples there is observed no or only a slight abrasion even after 100 to 1,000 rounds under higher loads than above.

2. Break resistance test

Figure 2:
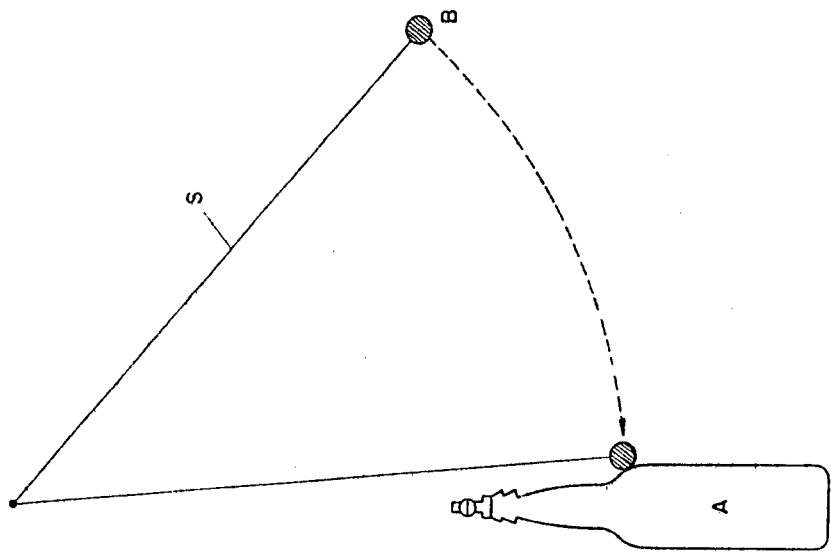

The test is conducted as illustrated in the FIG. 2. A glass bottle (A) to be tested is charged with 500 volume parts of water, and compressed air is introduced therein until the inner pressure is increased up to 3 kg/cm$^2$, followed by sealing. A steel ball (500 g. weight) (B) hung on a string (S) (5 m length) is struck against the shoulder of the bottle (A) at a head of 60 cm. so as to break the bottle. Number of glass pieces which are broken and scattered and the maximum scattering distance of the pieces are measured. The result is summarized in Table 2.

Table 2

| Test bottle | Maximum scattering distance (m) | Number of glass pieces which are broken and scattered. |
|---|---|---|
| Non-coated bottle | 8 to 12 | 10 to 20 |
| Control | 6 to 8 | 5 to 10 |
| Example 1 | 1 to 3 | 2 to 5 |
| 2 | 1 to 2 | 2 to 4 |
| 3 | 1 to 2 | 2 to 4 |
| 4 | 1 to 3 | 3 to 6 |
| 5 | 1 to 3 | 2 to 5 |

As is clear from the above, in the glass bottles of Examples, scattering of the broken glass pieces can effectively be inhibited, while in the glass bottle of the Control, inhibition of the scattering is not satisfactory.

EXAMPLES 6 – 12

In a similar manner to the foregoing Examples, a glass bottle for beer (633 ml. capacity, weight: 580g, wall thickness: 3–4mm) is coated at first with a base resin composition and then with a top coating solution as in such combinations as described below;

Base resin compositions a. 60 mole percent hydrolyzed product of a copolymer of 70 parts of ethylene with 30 parts of methylacrylate (melt index 240 g/10 g/10 min.)

b. Ionic copolymer of ethylene with methacrylic acid, which is ionized by neutralization with $Zn^{++}$ (manufactured and sold by E. I. du Pont de Nemours & Co. Inc. under registered tradename "Surlyn A 1650," specific gravity of 0.95, softening point of 75°C and melt index of 2 g/10 min.).

c. A copolymer of 50 parts of methyl methacrylate, 30 parts of butyl acrylate and 20 parts of β-hydroxyethyl methacrylate (melt index 350 g/10 min.).

d. The hydrolyzed vinyl acetate/ethylene copolymer in Example 3.

Top coating compositions i. Polyurethane solution used in Example 5.

ii. 385 parts of ethyl acetate, 80 parts of polybutyleneadipate (OH number = 140) and 28.8 parts of 1,4-cyclohexanedimethanol are admixed with 56.4 parts of ω,ω'-diisocyanate-1/3- dimethyl benzene and the solution is maintained at 70°C for 2 hrs. After addition of 0.1 part of zinc octoate, the reaction mixture is kept at 70°C for 8 hrs. under stirring and then diluted with 551 parts of cellosolve acetate. The polyurethane solution of non-volatile matter content (NV) 15 percent is obtained.

iii. 100 parts of polytetramethylene ether glycol (OH number 111), 18 parts of 1,4-butylene glycol and 75 parts of diphenylmethane diisocyanate are dissolved in 579 parts of cyclohexanone and kept at 90°C for 10 hrs under stirring. After dilution with 515 parts of cellosolve acetate, a polyurethane solution of NV 15 percent is obtained.

iv. 48 parts of polyester made of 2 moles of phthalic anhydride and 3 moles of propylene glycol, and 5.2 parts of 1,5-pentane diol are dissolved in 317 parts of ethyl acetate and maintained at 60°C. To this solution 26.1 parts of tolylene diisocyanate and 0.05 part of stannous octoate are added, and the reaction mixture is kept at 70°C for 18 hrs. A polyurethane solution of NV 20 percent is obtained.

| Example No. | Base resin | Top Coating |
|---|---|---|
| 6 | (a) | (i) |
| 7 | (b) | (i) |
| 8 | (c) | (i) |
| 9 | (d) | (i) |
| 10 | (d) | (ii) |
| 11 | (d) | (iii) |
| 12 | (d) | (iv) |

The glass bottles treated as in Examples 6–12 are subjected to the same tests as above. Result is described in Table 3.

Table 3

| Example | Load of bottle (B) (g) | Number of rounds | Abrasion | Maximum scattering distance (m) | Number of glass pieces scattered |
|---|---|---|---|---|---|
| 6 | 1200 | 1000 | — | 2 – 5 | 3 – 6 |
| 7 | 1200 | 1000 | — | 1 – 3 | 2 – 4 |
| 8 | 1200 | 1000 | — | 1 – 3 | 2 – 6 |
| 9 | 1200 | 1000 | — | 1 – 3 | 2 – 5 |
| 10 | 1200 | 1000 | — | 1 – 3 | 2 – 6 |
| 11 | 1200 | 1000 | — | 1 – 3 | 3 – 6 |
| 12 | 1200 | 1000 | — | 1 – 3 | 2 – 5 |

What is claimed is:

1. A coated glass bottle comprising a bottle having on the surface thereof a first coating layer of an olefine copolymer containing OH groups or OH and COOH groups in its molecule and a second coating layer of a thermoplastic polyurethane directly thereon.

2. A glass bottle as claimed in claim 1, wherein the olefine copolymer contains repeating units of a.

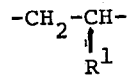

wherein $R^1$ is hydrogen or lower alkyl, b.

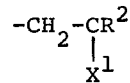

wherein $R^2$ is hydrogen or methyl and $X^1$ is —OH or —COO(CH$_2$)$_n$OH in which $n$ is 1, 2 or 3, or c.

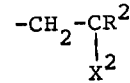

wherein $R^2$ has the same meaning as above and $X^2$ is —OCOR$^3$ or —COOR$^4$ in which $R^3$ and $R^4$ are lower alkyl, the total amount of the repeating units (b) and (c) in the copolymer being about 1 to about 50 mole percent, and the amount of the repeating units (b) being about 50 to about 100 mole percent relative to the total amount of the repeating units (b) and (c), and the olefine copolymer has a melt index of about 0.5 to about 1,000 g/10 min.

3. A glass bottle as claimed in claim 1, wherein the olefine copolymer contains OH groups rather than OH and COOH groups in its molecule.

4. A glass bottle as claimed in claim 1, wherein the olefine copolymer is a hydrolyzed product of a copolymer of an α-olefine having 2 to 4 carbon atoms with vinyl acetate, the degree of hydrolysis being about 5 to about 100 mole percent.

5. A glass bottle as claimed in claim 1, wherein the thermoplastic polyurethane has a molecular weight of about 10,000 to about 500,000, and is prepared by reacting an organic diisocyanate with a low molecular diol having an average molecular weight of about 60 to about 1,000 at a mole ratio of NCO/OH of about 1/1.

6. A glass bottle as claimed in claim 5, wherein the diisocyanate is tolylene diisocyanate, ω,ω'-diisocyanate dimethylbenzene, dicyclohexylmethane diisocyanate, or ω,ω'-diisocyanate dimethyl cyclohexane, or a polyurethane diisocyanate which is prepared by reacting an excess amount of said diisocyanate and a low molecular diol and having an average molecular weight of about 60 to about 1000.

7. A glass bottle as claimed in claim 1, wherein the first coating layer has a thickness of about 50 to about 500 microns, and the second coating layer has a thickness of about 5 to about 200 microns.

* * * * *